(12) United States Patent
Morrow et al.

(10) Patent No.: US 7,288,232 B2
(45) Date of Patent: Oct. 30, 2007

(54) SELF-CLEANING UV REFLECTIVE COATING

(75) Inventors: William H. Morrow, Barrie (CA); Larry James McLean, Barrie (CA)

(73) Assignee: L2B Environmental Systems, Inc., Barrie, Ontario (CA)

( * ) Notice: Subject to any disclaimer, the term of this patent is extended or adjusted under 35 U.S.C. 154(b) by 966 days.

(21) Appl. No.: 09/961,632

(22) Filed: Sep. 24, 2001

(65) Prior Publication Data
US 2003/0059549 A1    Mar. 27, 2003

(51) Int. Cl.
*B01J 19/08* (2006.01)
(52) U.S. Cl. .................... 422/186.3; 422/121
(58) Field of Classification Search ........... 428/688, 428/689; 422/186.3, 121
See application file for complete search history.

(56) References Cited

U.S. PATENT DOCUMENTS

| | | | | |
|---|---|---|---|---|
| 3,957,675 | A | 5/1976 | Schutt | 252/300 |
| 5,246,687 | A | 9/1993 | Gorre et al. | 423/554 |
| 5,991,080 | A * | 11/1999 | Kohta et al. | 359/584 |
| 6,013,372 | A * | 1/2000 | Hayakawa et al. | 428/411.1 |
| 6,083,871 | A * | 7/2000 | Fromson et al. | 502/439 |
| 6,154,311 | A * | 11/2000 | Simmons et al. | 359/359 |
| 6,228,480 | B1 * | 5/2001 | Kimura et al. | 428/328 |
| 6,235,351 | B1 | 5/2001 | DiMarzio et al. | 427/453 |

FOREIGN PATENT DOCUMENTS

| | | | |
|---|---|---|---|
| JP | 09-180526 | A * | 11/1997 |
| JP | 11-271511 | A * | 10/1999 |
| JP | 2000-676620 | A * | 3/2000 |
| JP | 2000118326 | | 4/2000 |
| JP | 2000-246115 | A * | 9/2000 |

OTHER PUBLICATIONS

Fujishima, A., "TiO$_2$ Photocatalysis: New Concepts And Environmental Applications" presented at the 8th International Fischer Symposium on Electrochemistry and Environment, Jun. 18-22, 2000. Universität Karlsruhe (TII), Germany, 4 pages.
Fujishima, A., "TiO$_2$ Photocatlysis Fundamental and Applications", BKC, Inc. May 1999.

* cited by examiner

*Primary Examiner*—Kishor Mayekar
(74) *Attorney, Agent, or Firm*—Woodard, Emhardt, Moriarty, McNett & Henry LLP

(57) ABSTRACT

A photo-catalytic overcoat on a UV reflective paint layer is employed to maintain high reflectance for long periods of time by continuously removing organic films when exposed to UV light. Advantageously, nano-particles comprising the photo-catalytic overcoat are composed of a semiconductor material that lead to the production of oxygen and hydroxyl free radicals when illuminated with UV light in the presence of water vapor. Some of these free radicals oxidize organic surface films, converting the surface films into gaseous $H_2O$ and $CO_2$. This reduces the amount of organic deposits on the surface of the reflective paint layer.

5 Claims, 2 Drawing Sheets

SELF-CLEANING UV REFLECTIVE COATING

FIELD OF THE INVENTION

The present invention relates to ultra-violet light (UV) reflective coatings and, in particular, to a self-cleaning UV reflective coating.

BACKGROUND OF THE INVENTION

Often Ultra-Violet (UV) light is used to remove unwanted organic material, such as viruses, bacteria and other bio-aerosols, from air or water. In the applicant's previously filed U.S. patent application, Ser. No. 09/822,886 (hereby incorporated herein by reference), an air purifier is described that uses UV light. Contaminated air enters such a device and is subject to UV light from one or more lamp sources. The air that leaves such a device is significantly reduced in unwanted organic material.

To increase efficiency, the UV produced by the sources within the air purifier is preferably not absorbed by the inner surfaces but, rather, is reflected. Often inner surfaces of such air purifiers are made of aluminum to provide a suitable amount of UV reflection. However, it is known in UV air purifiers that, as a consequence of the actions of the purifier, organic deposits (or films) may be formed on various surfaces within the purifier, including the UV light reflective surfaces. Such air purifiers rely on those surfaces to maintain high reflectance for maximum efficacy. Normally however, as the organic deposits build up, the reflectance of these surfaces is reduced.

Traditionally, the build up of organic deposits has not been a concern of those who own and operate air purification devices of the type described above. However, where such a build up is enough to reduce the reflectance of the inner surfaces and thereby the efficacy of the filter, is becomes clear that a need exists for a surface that can maintain high reflectance in a UV purifying environment for a longer period of time than provided by typical surfaces.

SUMMARY OF THE INVENTION

A photo-catalytic overcoat on a UV reflective surface is employed to maintain high reflectance for long periods of time by continuously removing organic films when exposed to UV light. Advantageously, the photo-catalytic overcoat is composed of nano-particles that cover a small proportion of the UV reflective surface. The nano-particles are made of a semiconductor material that leads to production of oxygen and hydroxyl free radicals when illuminated with UV light in the presence of water. Some of these free radicals oxidize surface films, converting the surface films into gaseous $H_2O$ and $CO_2$. This reduces the amount of organic deposits on the surface of the reflective paint layer.

In accordance with an aspect of the present invention there is provided a coating for a UV reflective substrate. The coating includes a plurality of nano-particles of a photo-catalytic material on the substrate, where the photo-catalytic material is a semiconductor material that leads to production of oxygen and hydroxyl free radicals when illuminated with UV light in the presence of oxygen.

In accordance with another aspect of the present invention there is provided a method of applying a self-cleaning UV reflective coating to a substrate. The method includes spraying the substrate with a plurality of nano-particles of a photo-catalytic material, where the photo-catalytic material is a semiconductor material that leads to production of oxygen and hydroxyl free radicals when illuminated with UV light in the presence of oxygen.

In accordance with a further aspect of the present invention there is provided an ultra-violet light reflective coating for a substrate. The coating includes a layer of ultra-violet light reflective paint and a plurality of nano-particles of a photo-catalytic material on the layer, where the photo-catalytic material is a semiconductor material that leads to production of oxygen and hydroxyl free radicals when illuminated with ultra-violet light in the presence of water.

In accordance with a still further aspect of the present invention there is provided a method of applying a self-cleaning UV reflective coating to a substrate. The method includes coating the substrate with a reflective paint and before the reflective paint dries, spraying the reflective paint with nano-particles of a photo-catalytic material, where the photo-catalytic material is a semiconductor material that leads to production of oxygen and hydroxyl free radicals when illuminated with ultra-violet light in the presence of water.

In accordance with an even further aspect of the present invention there is provided an ultra-violet irradiating device. The device includes a source of ultra-violet light, a substrate having an ultra-violet light reflective surface and a plurality of nano-particles of a photo-catalytic material on the surface of the substrate, where the photo-catalytic material is a semiconductor material that leads to production of oxygen and hydroxyl free radicals when illuminated with ultra-violet light in the presence of oxygen.

In accordance with still another aspect of the present invention there is provided a solution for use in coating a UV reflective surface including about one percent-by-weight of titanium oxide particles.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Figure 1:
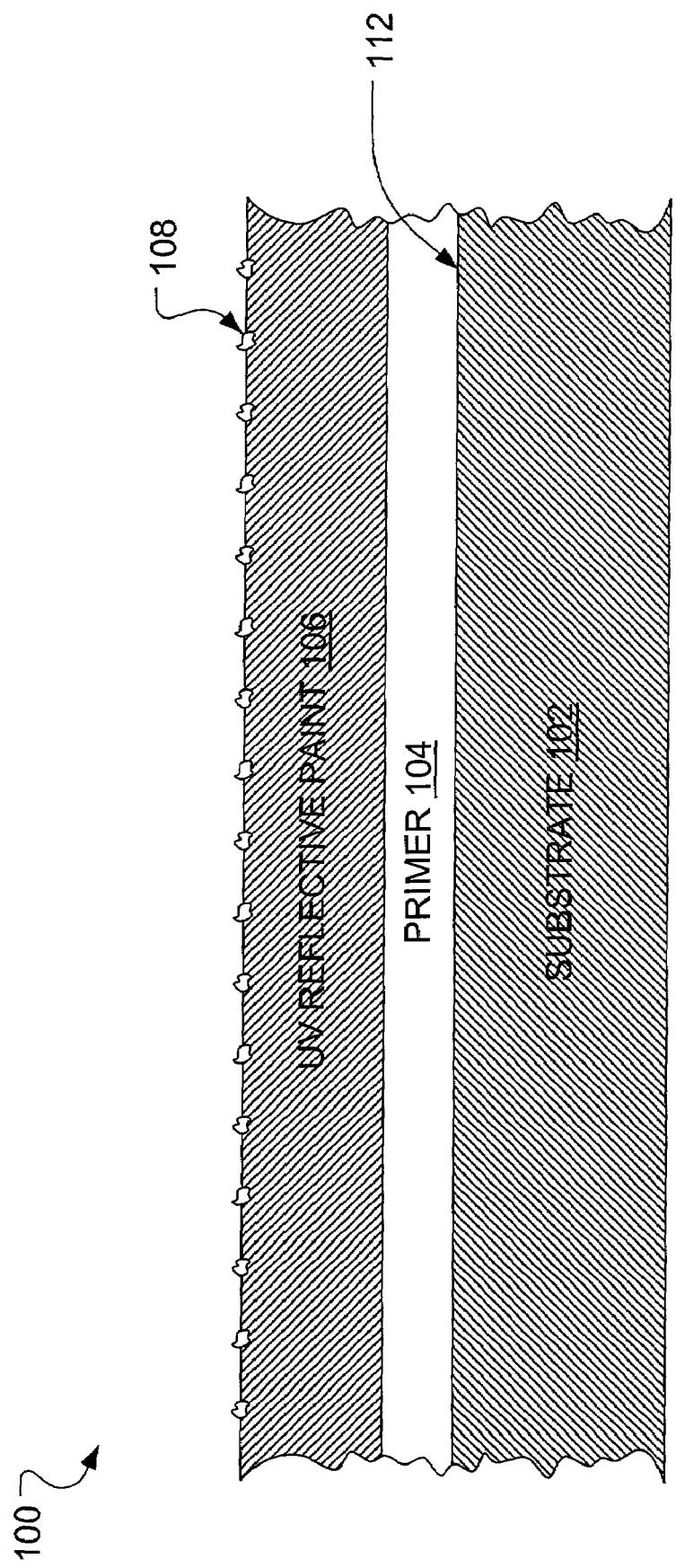
FIG. 1 illustrates a cross-section of a self-cleaning UV reflective coating exemplary of an embodiment of the present invention.

A cross-section of a self-cleaning UV reflective coating 100 exemplary of the present invention is illustrated in FIG. 1. A surface 112 of a substrate layer 102 is coated with a primer layer 104, which layer is then coated with a UV reflective paint layer 106. The UV reflective paint layer 106 has embedded in its upper surface nano-particles of a photo-catalytic semiconductor material, an exemplary nano-particle of which is indicated at 108.

In overview, nano-particles 108 are dispersed over the surface of the UV reflective paint layer 106. These nano-particles 108 are composed of a photo-catalytic semiconductor material that leads to the production of oxygen and hydroxyl free radicals when illuminated with UV light in the presence of water vapor. Some of these free radicals oxidize surface films, converting the surface films into gaseous $H_2O$ and $CO_2$. This reduces the amount of the organic deposits on the surface of the reflective paint layer 106. For minimum catalytic activity, the semiconductor material is ideally highly UV absorbing, however, this necessitates a method of application that minimizes the impact on the reflectance of the UV reflective coating.

It has long been accepted that UV reflective paint may be made through the use of barium sulfate crystals. See, for instance, U.S. Pat. No. 3,957,675, issued May 18, 1976 to Schutt, hereby incorporated herein by reference, for a discussion of appropriate choices for a binder. Further, consider U.S. Pat. No. 5,246,687, issued Sep. 21, 1993 to Gorre, also hereby incorporated herein by reference, for a preparation of barium sulfate that provides a high purity, which is of particular interest when preparing a UV reflective coating.

It is also known to use a photo-catalytic semiconductor material, such as $TiO_2$, to coat surfaces so that the coated surfaces may be self-cleaning. For a full discussion of the self-cleaning properties afforded a surface through the application of $TiO_2$, see Dr. Akira Fujishima, et al., "$TiO_2$ Photocatalysis Fundamentals and Applications", BKC, Inc., May 1999. Briefly, the excitation of $TiO_2$ by UV radiation in the presence of water vapor leads to the production of OH and $O_2^-$ free radicals according to the following reactions:

$$UV\ (@\ 254\ nm) + TiO_2 \xrightarrow{H_2O} OH + O_2^-.$$

The free radicals then interact with any organic deposits on the coated surface. Where the organic deposits are represented by the character "R", the following reactions describe the combination of these free radicals and organic deposits:

$nOH + R = \Rightarrow xH_2O + yCO_2$ $nO_2^- + R \Rightarrow xH_2O + yCO_2.$

When considering a $TiO_2$ coating on a layer of UV reflective paint, attention must be paid to the properties of $TiO_2$. In particular, $TiO_2$ is absorptive of UV. Thus, while historically $TiO_2$ has proven useful as a self-cleaning coating for ceramic tile, glass and mirrors among other substances, its usefulness in relation to UV reflective coatings was not apparent.

Returning to FIG. 1, the reflective paint layer 106 includes particles of a scattering material and a binding material. An exemplary composition consists of about 85 percent-by-weight barium sulfate 300 nm crystals and about 15 percent-by-weight of a 40 percent colloidal silica solution. These materials may be combined in a ball mill for 30 minutes of grinding. The components of the reflective paint layer 106 are chosen so that the reflective paint layer 106 is not reactive with the free radicals formed through the photo-catalytic action of the nano-particles 108. The scattering material used for the reflective paint layer 106 is selected for maximum scattering of incident optical energy. In choosing a suitable size for the particles (e.g., the 300 nm crystals), consideration must be given to a desired refractive index and the shape of the particles of scattering material. In general, the size for the particles will range from 20% to 200% of the wavelength of the light to be reflected. The binding material, colloidal silica in the above case, for the reflective paint layer 106 is selected for minimum absorbance at the wavelength to be reflected.

The reflective paint layer 106 may be applied to a substrate 102 of aluminum, galvanized steel or plastic (polyethylene) as follows:

If the substrate 102 is aluminum, the surface 112 may be pre-cleaned with a phosphoric acid based cleaner, such as ALUMIPREP® 33 marketed by U.S. Paint Corporation of St. Louis, Mo., then rinsed with distilled water. The cleaning action may comprise spraying the substrate 102 with the cleaner, washing the substrate 102 with the cleaner or dipping the substrate 102 in the cleaner. Abrasion, for additional cleaning, is optional. Alternatively, the surface 112 can be pre-cleaned with a $CO_2$ liquid spray. If the substrate 102 is galvanized steel, the surface 112 may be degreased with an organic solvent, such as acetone, or liquid $CO_2$. If the substrate 102 is plastic, the surface 112 may be pre-cleaned (i.e., sprayed, dipped) with isoproponal, then dried. Additionally, ultrasonic cleaning methods and agitation may be part of the above cleaning processes.

After preparation of the substrate surface, and before the application of the reflective paint layer 106, a primer layer 104 may be applied. The primer layer 104, though not entirely necessary, improves the adhesion of the reflective paint layer 106 to the substrate 102 and protects the substrate 102 from direct oxidization by free radicals. The primer layer 104 may be provided as a 40 percent-by-weight solution of 25 nm colloidal silica solution, spread over the surface 112 in a thin layer preferably 25 to 100 nm thick. This primer layer 104 provides a protective silica film over the underlying surface 112 which protects the surface 112 from direct oxidization by free radicals. If the substrate 102 is plastic, the surface 112 may be coated with a mixture of 25 nm silica solution combined with aluminum powder (10 percent-by-weight) to provide a UV-opaque coating.

After the surface 112 has been primed as above, the surface 112 is immediately coated with the reflective paint layer 106. The reflective paint layer 106 is coated on the primer layer 104 by dipping, spraying or brushing to a layer thickness of 100 to 400 μm.

Before the reflective paint layer 106 is allowed to dry, the reflective paint layer 106 is over coated with the photo-catalytic material as follows:

A solution of about one percent-by-weight of $TiO_2$ nano-particles is combined with water with or without a suspension agent such as colloidal silica. This solution is aerosolized in a collision nebulizer so that nano-particles of $TiO_2$ are formed at the nozzle of the nebulizer. These nano-particles are sprayed over the surface of the wet reflective paint layer 106. The spray rate is controlled so that the area coverage of the $TiO_2$ over the reflective paint layer 106 is less than about one percent.

Preferably, the nano-particles 108 have a size that is less than one tenth of the UV wavelength to be reflected. For example, where the UV wavelength to be reflected is centered at 254 nm, a nano-particle size of about 25 nm is appropriate, for instance, Titandioxid P 25 from Degussa of Dusseldorf, Germany. This size makes the nano-particles 108 nearly invisible to the UV light. Smaller particles have a further advantage of being closer together than larger particles for the same percentage of surface coverage. This proximity benefits the self-cleaning process in that, in general, the distance the free radicals are required to travel is reduced. The self-cleaning action of the nano-particles 108 may be increased through the use of larger particles or a higher percentage coverage, however, these increases come at the cost of increased UV absorption. In practical terms, the size of particle is limited to a range of 0.5 nm to 1000 nm while the percentage of coverage may range between 0.01% and 5.0%.

After coating with the nano-particles, the coating 100 is air dried at about 50° C. for 30 minutes, then baked at a temperature in the range from about 50° C. to about 350° C. for one hour or longer.

Figure 2:
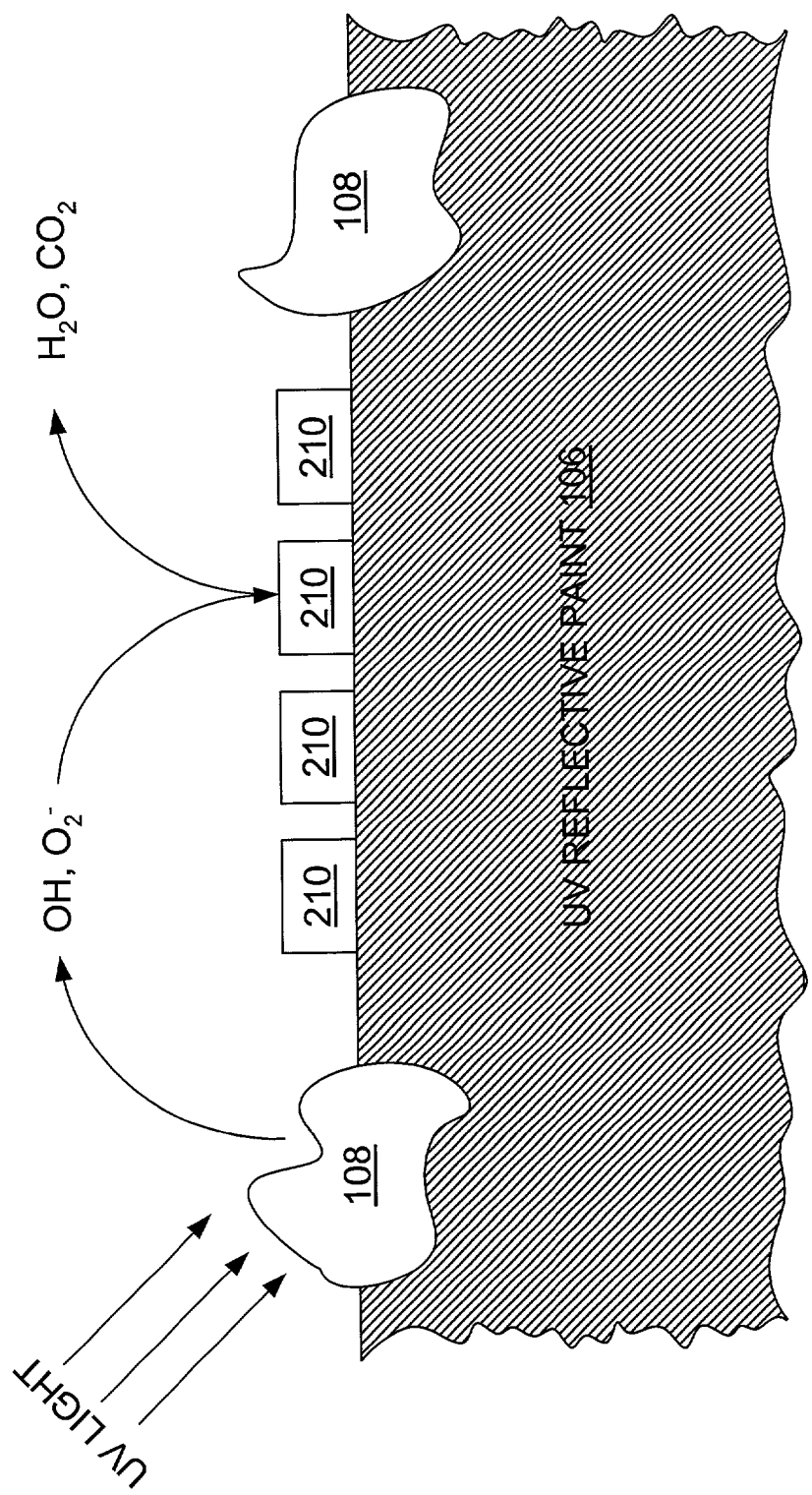
FIG. 2 illustrates a cross section of a small portion of the coating of FIG. 1 to demonstrate the self-cleaning operation of an embodiment of the present invention.

The operation of the coating is illustrated in FIG. 2. UV light strikes the photo-catalytic nano-particles 108, in the presence of water vapor, and OH and $O_2^-$ free radicals are created. These free radicals migrate to the surface of the reflective paint layer 106 by normal kinetic processes. Some of these free radicals oxidize surface films (often polymer chains of R groups, here indicated at 210), thereby converting the polymer chains 210 into gaseous $H_2O$ and $CO_2$, which drift away. This process tends to remove organic deposits from the surface of the reflective paint layer 106.

Since non-soluble materials are used for the preparation of the layers (104, 106), the coating 100 can be made water resistant. This makes the coating 100 suitable for high humidity or underwater applications.

The coating 100 can be applied to a multi-pass UV reflective cavity for UV exposure of air or water. Such a system takes advantage of the gain equation:

$$G = \frac{1}{1-R}$$

Where G is the optical gain of the cavity and R is the average reflectance of the cavity.

Such coatings may also be used in UV treated air conditioning and other heating, ventilation and air conditioning components. Such components such as a coil pains and coil blades can be made simultaneously UV reflective, which enhances a germicidal effect, and self-cleaning, which destroys organic deposits left by mold or bacteria.

In review, nano-particles 108 may be dispersed over the reflector so that they cover a small fraction of the reflector surface. The small amount of UV absorbed by the nano-particles 108 results in a photo catalytic process forming free radicals such as OH and $O_2^-$ Normal kinetic processes detach the free radicals formed on the surface of the nano-particles 108 and carry the free radicals over the adjacent surface of the reflective paint layer 106. These free radicals oxidize organic compounds on the surface of the reflective paint layer 106 converting the free radicals into gaseous $H_2O$ and $CO_2$ that float away, rendering the surfaces clean and highly reflective.

As will be apparent to a person skilled in the art, other scattering materials, e.g., aluminum oxide, may be used in making the reflective paint layer 106.

Furthermore, embodiments of the present invention may be realized without the reflective paint layer 106. With an appropriate form of adhesion, such as a thin, UV transparent glue, a coat of the nano-particles 108 may be applied directly to a UV reflective surface, such as aluminum. Such a form of adhesion would necessarily allow the surface to remain suitably UV reflective while not significantly hindering the reactions catalyzed by the nano-particles 108.

Other modifications will be apparent to those skilled in the art and, therefore, the invention is defined in the claims.

We claim:

1. An enhanced ultra-violet (UV) light reflector comprising: an ultra-violet light reflective substrate; and a plurality of nano-particles of a photo-catalytic material partially embedded in said substrate, said nano-particles covering 0.01% to 5.0% of a surface area of said substrate so as to not materially affect UV reflectance, where said photo-catalytic material is a semiconductor material that leads to production of oxygen and hydroxyl free radicals when illuminated with ultra-violet light in the presence of water.

2. The reflector of claim 1 wherein said plurality of nano-particles cover about one percent of a surface area of said substrate.

3. The reflector of claim 2 wherein said photo-catalytic material is $TiO_2$.

4. The reflector of claim 1 wherein said nano-particles have a size of between 0.5 nm and 1,000 nm.

5. The reflector of claim 4 wherein said nano-particles have a size of about 25 nm.

* * * * *